United States Patent [19]

Takada

[11] 4,353,579
[45] Oct. 12, 1982

[54] AUTOMOBILE PASSIVE TYPE SAFETY SEAT BELT SYSTEM

[76] Inventor: Juichiro Takada, 3-12-1, Shinmachi, Setagayaku, Tokyo, Japan

[21] Appl. No.: 195,726

[22] Filed: Oct. 10, 1980

[30] Foreign Application Priority Data

Oct. 18, 1979 [JP] Japan .................. 54-143328[U]

[51] Int. Cl.³ ............................................ B60R 21/10
[52] U.S. Cl. ................................................... 280/804
[58] Field of Search ...................... 280/804, 803, 802

[56] References Cited

U.S. PATENT DOCUMENTS

| | | | |
|---|---|---|---|
| 3,915,473 | 10/1975 | Lindblad | 280/804 |
| 4,241,941 | 12/1980 | Yamamoto | 280/804 |
| 4,286,804 | 9/1981 | Maekawa | 280/804 |

*Primary Examiner*—Robert R. Song

*Attorney, Agent, or Firm*—Brumbaugh, Graves, Donohue & Raymond

[57] ABSTRACT

A simplified motion amplifier arrangement for a passive restraint belt system comprises a movable belt hanger transferable along a guide rail and connected with an output driving member which engages an output gear wheel. A link rod arranged to slide along a second guide rail is releasably attached in an eye provided on the vehicle body near the dash and accessible to the passenger. The rearward end of the link rod is connected with an input driving member which engages a smaller input gear wheel mounted concentric to and rotatable with the output gear wheel. When the door is opened, the link rod is pulled forward, thereby pushing the input gear member to drive the gear wheels. As the output gear rotates it pulls the output driving member to transfer the belt from the restraining to the releasing position.

4 Claims, 3 Drawing Figures

AUTOMOBILE PASSIVE TYPE SAFETY SEAT BELT SYSTEM

BACKGROUND OF THE INVENTION

This invention relates to a passive vehicle occupant restraint belt system in which the belt is automatically, easily and effectively transferred between an occupant-restraining position and an occupant-releasing position in response to opening and closing movements of a door, and more particularly, to a system wherein the motion amplifying mechanism thereof is greatly simplified.

In many conventional passive restraint belt systems, the belt is transferred between the restraining position and the releasing position by a mechanical drive system including an amplifier mechanism and a lever responsive to the opening and closing of the door installed on the door between the hinged end of the door and the vehicle body. Because the displacement of the door at the hinged end is relatively small, the movement of the lever must be multiplied considerably to move the belt hanger along the guide rail between the restraining and releasing positions. The multiplication factor is often above 5 and may range higher than 20.

Various proposals have been offered to reduce this multiplication factor, as for example, an amplifier arrangement comprising several pairs of pulleys connected by crossed-cords. However, this pulley-type arrangement adds considerably to the force required to open and close the door, and therefore is not especially practical. Other systems have been proposed which operate to move the belt fully from the restraining position to the releasing position only during the initial opening movement of the door. These arrangements typically also require a strong manual force, however.

SUMMARY OF THE INVENTION

Accordingly, an object of the invention is to provide a simplified motion amplifier arrangement which reduces the multiplication factor of the motion amplifier mechanism, and, therefore, does not require a strong manual force to operate.

In accordance with the invention, a continuous restraint belt is reflexed into a lap belt portion and a shoulder belt portion by a through-ring attached to the end of a control belt. The lap belt portion passes through a movable belt hanger transferable along a guide rail mounted on the door surface between a rearward, occupant-restraining position and a forward, occupant-releasing position responsive to the opening of the vehicle door.

A second guide rail is mounted on the door surface and receives a second slider which is attached to the rear end of a link rod which is easily accessible to the vehicle passenger. The front end of the link rod is bent to form a hook which is received in an eye located near the dash which is also accessible to the passenger from within the vehicle. The second slider is coupled with an input driving wire, such as a racked wire, which engages an input gear wheel of the amplifier mechanism. A larger output gear wheel is mounted concentric to and rotatable with the input gear. In accordance with the invention, the ratio of the number of teeth on the output gear wheel to the number of teeth on the input gear wheel is within the range of from about 2:1 to about 3.5:1. The larger output gear wheel engages an output driving wire, the end of which is coupled with the movable hanger through which the lap belt passes. When the door is opened the second slider is pulled forward along its guide rail, thereby pushing the input driving wire and driving the input gear wheel. The larger output gear wheel rotates with the input gear wheel and thereby pulls the output driving wire to pull the movable belt hanger upward and forward along the guide rail toward the releasing position when the door closes. It will be appreciated by those skilled in the art that the reverse process occurs when the door is closed to push the belt toward the restraining position.

In an alternative embodiment the amplifier is located at the rear of the door opposite the hinged end, and as the door opens the output drive wire pushes, rather than pulls, the belt hanger from the restraining position toward the releasing position.

The invention is a mechanism of simple construction and operation, and, therefore, complicated response mechanisms and linking mechanisms are not required. Further, because the second guide rail receiving the slider associated with the input drive wire is located on the inner surface of the door, a relatively large input displacement as compared to conventional systems is obtained, which reduces the multiplication factor necessary to transfer the belt between the restraining the releasing positions. Accordingly, a smooth and light manual motion of the door results.

For a better understanding of the present invention, reference is made to the following description of exemplary embodiments, taken in conjunction with the attached drawings.

DETAILED DESCRIPTION OF EXEMPLARY EMBODIMENTS

Figure 1:
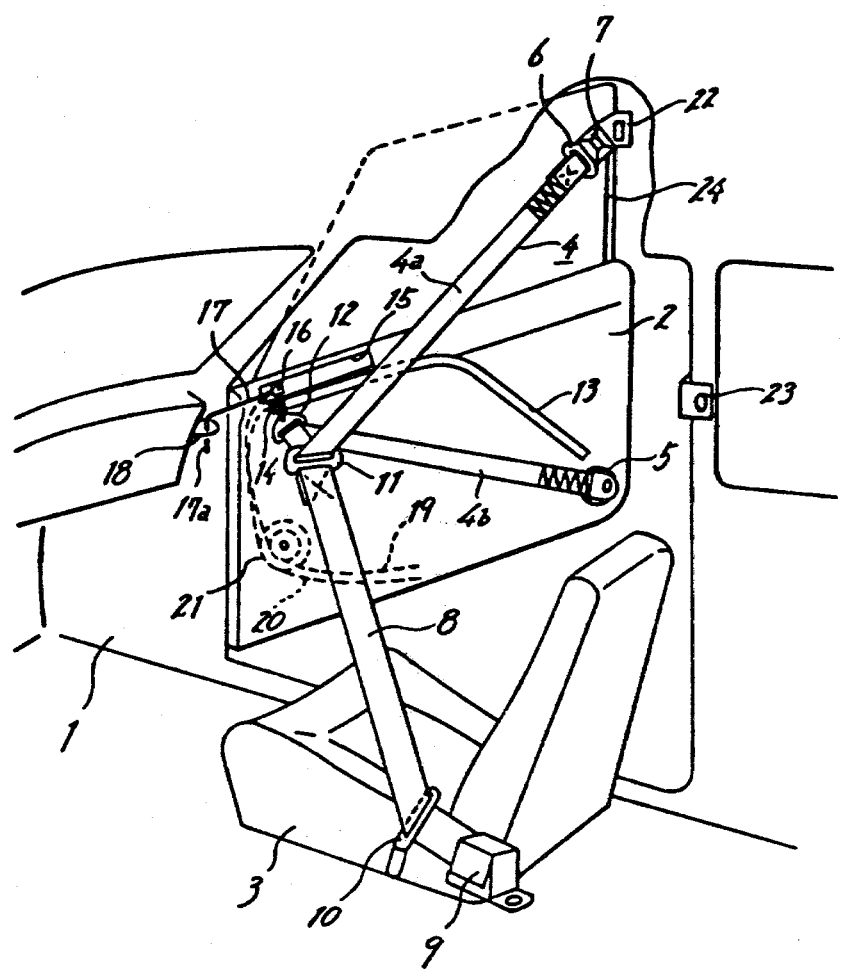
FIG. 1 is a pictorial view in schematic form of a complete belt system incorporating the present invention illustrating the system in the occupant-releasing position.
Figure 2:
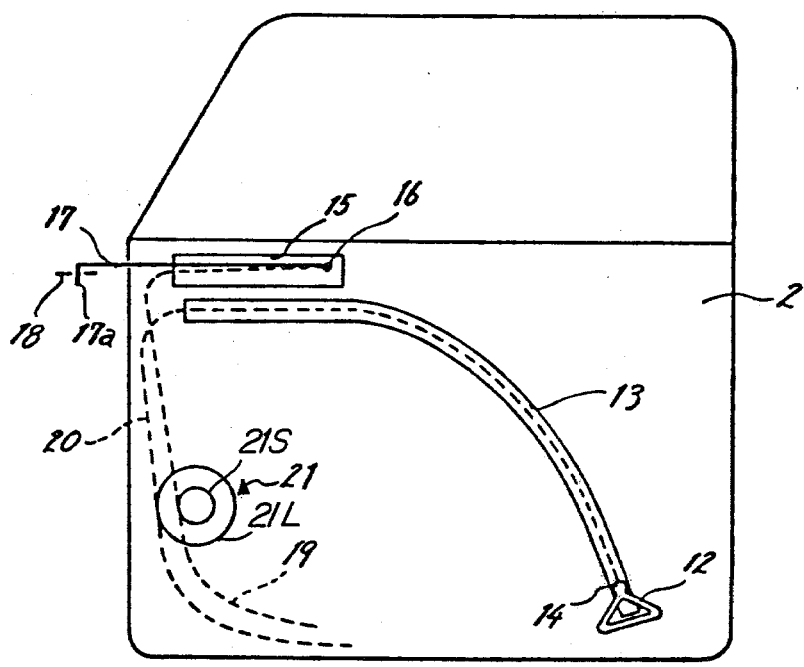
FIG. 2 is a schematic view of a door of a vehicle incorporating the present invention illustrating the system in the occupant-restraining position.

As shown in FIGS. 1 and 2, the restraint belt system is associated with a door 2 that is hinged along its front end to the vehicle body 1, and employs a single continuous restraint belt 4. The bottom end of the belt 4 is attached to an anchor 5 at the lower rear corner of the door 2. The belt 4 extends upwardly from the anchor 5 to form a lap belt section 4b, passes through a hanger 12 and a through-ring 11 and extends upwardly beyond the through-ring 11 to form a shoulder belt section 4a. Attached to the top end of the shoulder belt section 4a is a tongue plate 6 which is received in a buckle 7 anchored at the upper rear corner of the door 2. The end of the shoulder belt section 4a adjacent the tongue plate 6, and the end of the lap belt section 4b adjacent the anchor 5, may be provided with tear-away stitching to permit energy absorption during an impact, as described in the present inventor's co-pending U.S. patent application Ser. No. 115,783 filed Jan. 28, 1980.

The through-ring 11 reflexes the continuous belt 4 into the shoulder belt section 4a and lap belt section 4b, and is attached to a control belt 8 which leads through a belt guide 10 from an emergency locking retractor 9, preferably of the type having a belt clamp, fastened to the vehicle floor on the inboard side of the seat 3. The hanger 12 through which the lap belt section 4b passes is located between the through-ring 11 and the anchor 5, and includes a slider 14 received in a guide rail 13 installed on the inner surface of the door 2. As will be described, the slider 14 is connected to an output transmission means, such as a racked wire 20, to transfer the hanger 12 backward and forward along the guide rail 13 and thereby transfer the belt 4 between the restraining and releasing positions.

A second guide rail 15 is also provided on the inner surface of the door 2, below the window frame and adjacent the hinged front end of the door 2. A second slider 16 slides backward and forward in the second guide rail 14, and is connected to the rearward end of a link rod 17 which is easily accessible to the vehicle passenger. To provide a smooth and relatively silent sliding motion of the slider 16 in the guide rail 15, a synthetic resin may be used in either. The front end of the link rod 17 is bent to form a hook 17a which is inserted into a an eye 18 provided inside the vehicle 1 near the dash and also within reach of the passenger. Because the link rod 17 is attached to the vehicle 1 by merely inserting the hook 17a into the eye 18, the hook 17a can be removed easily from the eye 18 in the event of emergency to permit the rod 17 to be moved manually and thereby transfer the belt to and from the restraint position.

The second slider 16 is fastened to one end of an input driving member 19, such as a racked wire, which engages a relatively small input gear wheel 21S of a motion amplifier mechanism 21 mounted in the door 2. A larger output gear wheel 21L is mounted concentric to and rotatable with the smaller input gear wheel 21S. A second, output driving member 20, such as another racked wire, engages the output gear wheel 21L, and its end is fastened to the belt slider 14 attached to the belt hanger 12.

The displacements of the input and output arrangements are determined by the gear ratio of the gear wheels 21S and 21L, which ratio in turn will determine the ratio of the length of the guide rail 15 relative to the length of the guide rail 13. In accordance with the invention this gear ratio (i.e., the ratio of the number of teeth on the smaller gear wheel 21S to the number of teeth on the larger gear wheel 21L), is within the range of from about 2:1 to about 3.5:1, although the ratio is not limited to this range.

When the door 2 is closed and the system is in the occupant-restraining position, the link rod slider 16 is positioned at the rear end of the guide rail 15, and the belt slider 14 is positioned at the rear end of the guide rail 13 (i.e., the lower rear section of the door 2 adjacent the anchor 5). The control belt 8 is withdrawn into the retractor 9, and the through-ring 11 is located at the inboard side of the seat 3, thereby branching the continuous belt 4 into the shoulder belt section 4a and lap belt section 4b to restrain the occupant.

Upon opening the door 2, the link rod slider 16 will move forward along the rail 15, thus pushing the input driving member 19 which engages the smaller input gear wheel 21S of the amplifier mechanism 21 to drive the input gear wheel 21S and the larger output gear wheel 21L (counterclockwise in FIG. 2). The output driving member 20 which engages the larger output gear wheel 21L thus pulls the belt slider 14 upward and forward along the guide rail 13, toward the occupant-releasing position illustrated in FIG. 1.

It will be apparent to those skilled in the art that when the door is moved from the open position toward the closed position the link rod slider 16 will move backward along the second guide rail 15 while at the same time pulling the input driving member 19 to rotate the input gear wheel 21S clockwise. This in turn drives the output gear wheel 21L to push the belt slider 14 rearwardly and downwardly along the guide rail 13 until the door 2 is completely closed and the lap and seats belt sections 4b and 4a, respectively, are in the occupant-restraining position.

Figure 3:
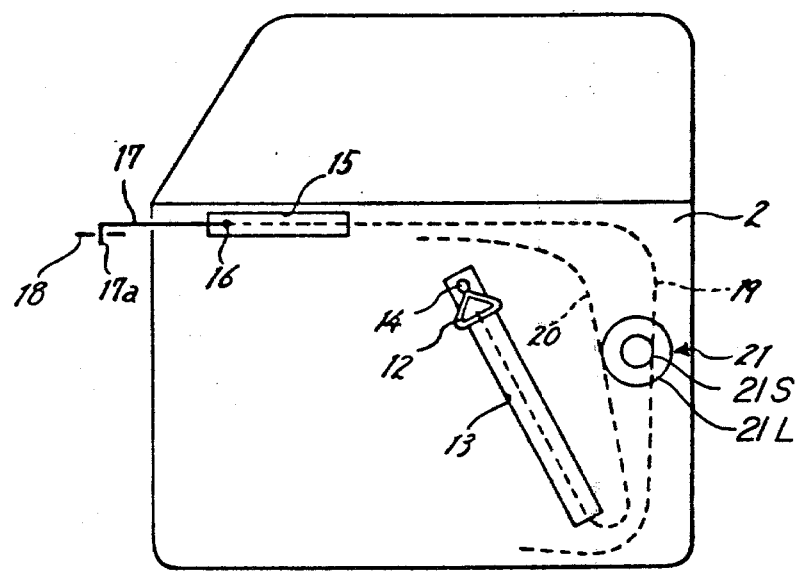
FIG. 3 is a schematic view of a door of a vehicle incorporating an alternative embodiment of the present invention illustrating the system in the occupant-releasing position.

The arrangement shown in FIG. 3 operates on the same principle, but in the opposite manner, as the arrangement shown in FIGS. 1 and 2. The motion amplifier 21 is located at the rear end of the door 2 opposite the hinged end. The output driving member 20 pushes the belt slider 14 into the releasing position, i.e., from the rear of the door 2 toward the front of the door 2 when the door 2 is opened. When the door 2 is closed the gear wheels 21S and 21L rotate clockwise and the output driving member 20 pulls the slider 14 downwardly toward the restraining position.

In the event of an emergency or accident rendering the door 2 inoperative, a passenger may disengage the tongue plate 6 and buckle 7 to release himself from the restraint system. Additionally, the hook 17a of the link rod 17 may be removed from the eye 18 and pulled forward manually to move the system toward the releasing position.

The above-described embodiments are intended to be merely exemplary, and numerous variations and modifications can be made readily by those skilled in the art without departing from the spirit and scope of the invention. All such variations and modifications are intended to be included within the scope of the invention as defined in the appended claims.

I claim:

1. In a passive occupant restraint belt system for a vehicle which includes a restraining belt, apparatus for moving the belt from an occupant-restraining position to an occupant-releasing position in response to opening of a door of the vehicle comprising belt transfer means engaging the belt for moving the belt along a guide means from the restraining position to the releasing position, and output transmission means coupled to the belt transfer means for transmitting and amplifying opening motions of the door to the transfer means, and a motion amplifier mounted in the door, the improvement wherein the motion amplifier comprises (a) an output gear wheel engaging the output transmission means of the belt and (b) a second input gear wheel having a smaller diameter and mounted concentric to and rotatable with the output gear wheel and engaging a second input transmission means, the second input transmission means being coupled to the rearward end of a link rod by a second transfer means received in a second guide means and transferable between a rearward position along the second guide rail corresponding to the occupant-restraining position and a forward position along the second guide rail corresponding to the occupant-releasing position, the forward end of the link rod being releasably attached to the body of the vehicle.

2. The improvement according to claim 1, wherein the ratio of the number of teeth on the output gear wheel to the number of teeth on the input gear wheel is within the range of from about 2:1 to about 3.5:1.

3. The improvement according to claim 1 or 2, wherein the input transmission means and the output transmission means each comprise racked wire.

4. The improvement according to claim 3, wherein the belt transfer means includes a through-ring through which the restraining belt passes having a control belt attached thereto, the control belt being withdrawn from a retractor affixed to the vehicle adjacent the inboard side of a vehicle seat.

* * * * *